Dec. 28, 1948 R. A. TOLLEFSEN ET AL 2,457,286
MAXIMUM DEMAND INDICATOR
Filed Nov. 28, 1947

INVENTORS
REIDAR A. TOLLEFSEN
ROBERT A. HUNT
BY
ATTORNEY

Patented Dec. 28, 1948

2,457,286

UNITED STATES PATENT OFFICE 2,457,286

MAXIMUM DEMAND INDICATOR

Reidar A. Tollefsen, Brighton, and Robert A. Hunt, Greece, N. Y., assignors to Rochester Manufacturing Company, Rochester, N. Y., a corporation of New York Application November 28, 1947, Serial No. 788,748

9 Claims. (Cl. 116—129)

The present invention relates to dial gauges, and particularly to dial gauges which have, besides the standard indicating pointer, a maximum pointer to indicate the maximum reading of the gauge. In a more specific aspect, the invention relates to dial thermometers, and particularly to bi-metallic type dial thermometers which have a maximum pointer to indicate a maximum temperature reading.

Maximum pointers are quite commonly used on pressure gauges, thermometers, and other types of dial gauges. The maximum pointer is operatively connected with the indicating pointer of the gauge to move in one direction with the indicating pointer, so as to be carried by the indicating pointer to the highest point of movement in one direction of the indicating pointer. The maximum pointer is adapted to stay put at this highest point of reading, when the indicating pointer turns or falls back from that highest point. Thus, the user of the gauge can determine the maximum reading for a given measurement or condition or for a given period. The maximum pointer is adapted to be reset manually to zero when desired.

In gauges of conventional design, the maximum pointer is adapted to be held in the place of maximum reading by friction. This friction must be of sufficient strength to prevent creeping or shifting of the maximum pointer, even if the gauge is subjected to vibration. In conventional gauges, the holding means is a coil spring or spring washer and the maximum pointer must be moved by the indicating pointer against the friction exerted by the spring or spring washer. Such holding means, of course, exert a drag on the indicating pointer; and this affects the accuracy of the reading of the gauge.

One object of the present invention is to provide a dial gauge with a maximum pointer in which the drag on the indicating pointer will be reduced to a minimum and will be substantially less than with maximum reading gauges of conventional design.

Another object of the invention is to provide a maximum pointer type gauge in which springs or similar type friction means for holding the maximum pointer in place are eliminated.

Another object of the invention is to provide a gauge with a maximum pointer in which the maximum pointer can easily be reset without any frictional drag thereon.

Still another object of the invention is to provide a gauge with a maximum pointer that is sealed against moisture so that it will be possible to use the gauge for outside installations.

Further objects of the invention are to provide a maximum pointer type gauge which will be simple in construction and compact and which will be of increased accuracy.

Other objects of the invention will be apparent hereinafter from the specification and from the recital of the appended claims.

Figures 1, 2, 3:
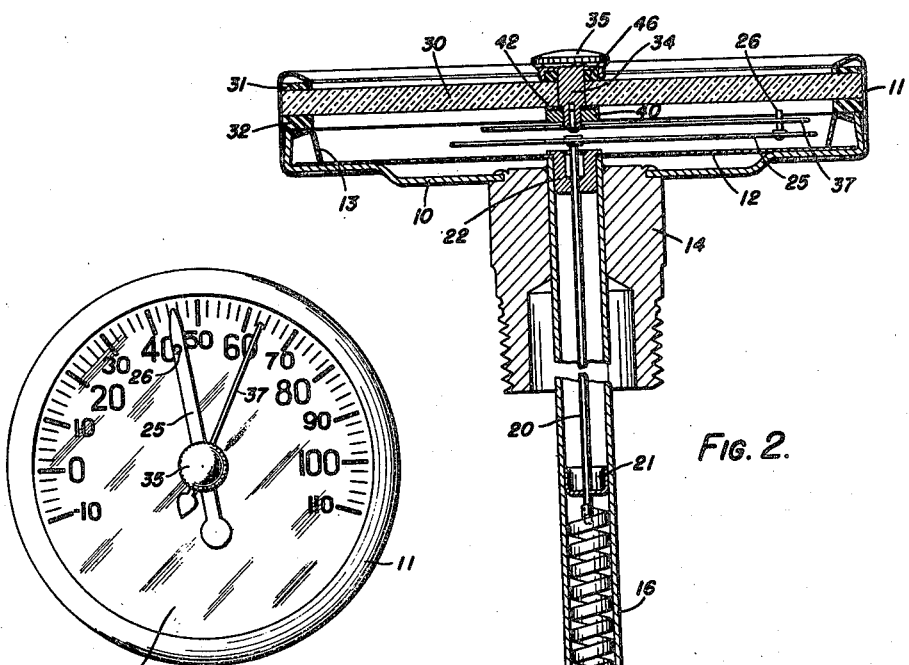
Fig. 1 is a plan view of a dial type thermometer made according to one embodiment of this invention.
Fig. 2 is a vertical sectional view through this thermometer.
Fig. 3 is an exploded view showing the indicating pointer, the maximum pointer, and the parts associated therewith.

The invention has been illustrated in the drawings in connection with a bi-metallic type dial thermometer. This thermometer comprises the usual casing 10, bezel 11, graduated dial 12, dial retaining ring 13, body member 14, bi-metallic element 15, and protector tube 16. The bi-metallic element 15 comprises a helical coil made of a suitable bi-metallic ribbon and may be of conventional structure. At one end this element may be connected in conventional fashion to an anchoring plug 18 and at its opposite end to a pointer stem 20. The pointer stem may be journaled in conventional fashion at opposite ends in bearings 21 and 22 which fit into the tube 16.

Secured to the upper end of the pointer stem in any suitable or conventional manner is an indicating pointer 25. This indicating pointer may be of conventional design, but has a pin 26 secured thereto near its outer end which serves to engage the maximum pointer as will be described hereinafter. The pin 26 is at one side of the longitudinal center line of the indicating pointer.

The bezel 11 fits over the casing 10 and serves to hold the glass or crystal 30 against the tops of the casing and of the spacing ring 13. The crystal may be sealed in place in conventional manner by the gaskets 31 and 32, one of which is interposed between the top of the crystal and the bezel, and the other of which is interposed between the bottom of the crystal and the tops of the casing and spacing ring.

In the preferred embodiment of the present invention, the crystal 30 is bored centrally to receive the stem portion 34 of a knurled knob 35. Mounted in a hole in the lower end of the stem 34 is a pin 36 (Fig. 3) which is preferably made of stainless steel. Mounted on this pin is a maximum pointer 37 which is made of a magnetically attractable metal, preferably steel. This pointer has a hole 38 in it to receive the pin 36; and the pin has an enlarged head 39 so as to prevent the pointer from falling off of the pin. The pin and maximum pointer may be welded or fastened together in any conventional manner.

The portion 41 of the stem 34 which extends below the crystal or glass 30 is of reduced diameter. Fastened to this portion of the stem is a ring 40 which may be made of any suitable permanently magnetized material. A non-metallic washer 42 is interposed between the magnet and the glass 30.

In use, the indicating pointer 25 moves with variations in temperature as in a conventional dial thermometer; and as it moves in the direction of higher readings, the pin 26 on the pointer 25 engages the maximum pointer 37 carrying the maximum pointer with the indicating pointer, the maximum pointer rotating on its bearing pin 36. When the temperature falls, however, the indicating pointer 25 drops back to record the temperature at the moment; but the maximum pointer remains at the maximum reading. Such a condition is indicated in Fig. 1, where the indicating pointer 25 is recording the temperature at the moment, which is several degrees lower than the highest temperature reached as indicated by maximum pointer 37.

The maximum pointer is held in any position, to which it is moved by indicating pointer 25, by the power of the magnet 40. The magnet is close to the maximum pointer and to increase its holding power, the hub portion 45 of the maximum pointer may be made of enlarged diameter to approximate the diameter of the magnetic ring 40.

While the holding power of the magnet is thus sufficient to retain the maximum pointer in any position to which it may be moved by the indicating pointer, the magnetic attraction exerted by the ring 40 is not enough to create any appreciable drag on the indicating pointer when the indicating pointer is moving in a direction to carry the maximum pointer with it. The magnetic attraction of the ring 40 for maximum pointer 37 will not, therefore, affect, beyond the permissible tolerances, the readings of the indicating pointer. With our construction, then, we have provided a maximum pointer gauge of increased accuracy as compared with prior designs of such gauges.

Since the magnet 40 is fastened to the knurled knob 35, when it is desired to reset the maximum pointer, all that is necessary is to turn the knob. The magnet turns with the knob and the maximum pointer follows the magnet by magnetic attraction; and may thus be reset to zero or to any other point desired.

For various purposes, as for outdoor use, it may be desirable to make the thermometer watertight. For this purpose, the knob 35 is recessed on its underside; and a rubber washer 46 is mounted in this recess. This washer seats against the upper face of the glass 30. It is made of sufficient thickness that, when in place, it will be compressed, between the knurled knob and the crystal. Thus, it will seal against water leaking through the hole in the glass. This washer also prevents breakage of the glass when the magnet 40 is staked to the knob 35.

While the invention has been described in connection with a dial type thermometer, it is obvious that the maximum pointer construction may be applied to any dial type gauge. Thus it may be used on pressure gauges, micrometer gauges, etc. It has been shown in connection with a bi-metallic type thermometer simply for the purposes of illustration and it is to be understood is by no means restricted to such use.

Moreover, while the invention has been described as applied to a maximum pointer gauge it is to be understood that the expression "maximum pointer" is relative, and that the invention may be used, also, where the recording pointer indicates minimum readings. In this case, of course, the pin 26 will be at the opposite side of the longitudinal center line of the indicating pointer to move the recording pointer 37 with the indicating pointer only when the indicating pointer moves toward the low end of the scale 12.

Furthermore, while the invention has been described in connection with a particular embodiment thereof, it is to be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention what we claim is:

1. A dial gauge having a movable indicating pointer and a recording pointer, means for moving the recording pointer on movement of the indicating pointer in one direction, and magnetic means for holding the recording pointer in any position to which it is moved by the indicating pointer.

2. A dial gauge having a rotary indicating pointer, a recording pointer mounted for rotation on an axis aligned with the axis of rotation of the indicating pointer, means for moving the recording pointer on movement of the indicating pointer in one direction, said recording pointer being made of a magnetically attractable material, and a piece of permanently magnetized material mounted coaxially with the two pointers for holding the recording pointer in any position to which it may be moved by the indicating pointer.

3. A dial gauge comprising a rotary indicating pointer which is movable in the operation of the gauge, a ring made of magnetized material, and a recording pointer journaled coaxially with said ring and close to said ring and made of a magnetically attractable material, and means for moving the recording pointer on movement of the indicating pointer in one direction.

4. A dial gauge comprising a rotary indicating pointer which is movable in the operation of the gauge, a supporting member, a recording pointer, which is made of a magnetically attractable material, journaled on said supporting member, means for moving the recording pointer in one direction on movement in one direction of the indicating pointer, and a ring made of permanently magnetized material mounted on said supporting member to surround the hub of the recording pointer to hold the recording pointer in any position to which it may be moved by the indicating pointer.

5. A dial gauge comprising a casing, a crystal mounted on the casing to close one end of the same, a bearing member mounted in said crystal, an indicating pointer rotatably mounted in the casing, a recording pointer, which is made of a magnetically attractable material, journaled on said bearing member interiorly of the casing, means for moving the recording pointer in one direction on movement in one direction of the indicating pointer, a knob secured to the bearing member exteriorly of the crystal to permit rotation of the bearing member for moving the recording pointer in the opposite direction, and a magnetic member mounted in the casing coaxial with the pointers and close to the recording pointer to hold the recording pointer in any position to which it may be moved by the indicating pointer.

6. A dial gauge comprising a casing, a crystal mounted on the casing to close one end of the same, a bearing member mounted in said crystal, an indicating pointer rotatably mounted in the casing, a recording pointer having a hub portion which is journaled on the bearing member interiorly of the casing and which is made of magnetically attractable material, means for moving the recording pointer in one direction on movement in one direction of the indicating pointer, a magnetic ring mounted on the bearing member coaxial with the hub of the recording pointer and close thereto, and a knob secured to the bearing member exteriorly of the crystal for rotating the bearing member.

7. A dial gauge comprising a casing, a crystal mounted on the casing to close one end of the same, a bearing member mounted in said crystal, an indicating pointer rotatably mounted in the casing, a recording pointer having a hub portion which is journaled on the bearing member interiorly of the casing above and in axial alignment with the indicating pointer, said recording pointer being made of magnetically attractable material, means secured to the indicating pointer for moving the recording pointer in one direction on movement in one direction of the indicating pointer, a magnetic ring mounted on the bearing member coaxial with the hub of the recording pointer and close thereto, a knob secured to the bearing member exteriorly of the crystal for rotating the bearing member, and a flexible sealing member surrounding said bearing member and mounted exteriorly of the crystal between the knob and the crystal to seal the opening in the crystal in which the bearing member is mounted.

8. A dial gauge comprising a casing, a pointer mounted in said casing and movable therein to indicate a measurement, said pointer being made of a magnetically attractable material, a knob journaled in the casing, a magnet secured to said knob close to said pointer, said magnet serving to hold the pointer in any position to which it may be moved in response to a measurement, and said knob being rotatable to move the pointer independently of any measuring movement thereof.

9. A dial gauge comprising a casing, a bearing member journaled in said casing, a pointer journaled on said bearing member and rotatable thereon to indicate a measurement, said pointer being made of a magnetically attractable material, a magnet secured to the bearing member close to the pointer and adapted to hold the pointer in any position to which it may be moved in response to a measurement, and a knob secured to the bearing member exteriorly of the casing to rotate the pointer independently of any measuring movement thereof.

REIDAR A. TOLLEFSEN.
ROBERT A. HUNT.

REFERENCES CITED

The following references are of record in the file of this patent:

UNITED STATES PATENTS

| Number | Name | Date |
| --- | --- | --- |
| 1,686,635 | Mylius et al. | Oct. 9, 1928 |
| 1,734,183 | Shore | Nov. 5, 1929 |
| 1,945,456 | Wardenburg | Jan. 30, 1934 |